(12) United States Patent  (10) Patent No.: US 7,815,417 B2
Somanath et al.  (45) Date of Patent: Oct. 19, 2010

(54) GUIDE VANE FOR A GAS TURBINE ENGINE

(75) Inventors: Nagendra Somanath, Manchester, CT (US); Keshava B. Kumar, South Windsor, CT (US)

(73) Assignee: United Technologies Corporation, Hartford, CT (US)

(*) Notice: Subject to any disclaimer, the term of this patent is extended or adjusted under 35 U.S.C. 154(b) by 893 days.

(21) Appl. No.: 11/515,101

(22) Filed: Sep. 1, 2006

(65) Prior Publication Data

US 2008/0056888 A1 Mar. 6, 2008

(51) Int. Cl.
 *F01D 9/04* (2006.01)

(52) U.S. Cl. .................. 415/191; 415/116; 415/142; 415/208.2; 415/210.1; 415/211.2; 416/226; 416/232; 416/233

(58) Field of Classification Search ......... 415/115–116, 415/142, 191, 200, 208.1, 208.2, 209.3, 209.4, 415/210.1, 211.2; 416/96 A, 226, 229 A, 416/232–233
See application file for complete search history.

(56) References Cited

U.S. PATENT DOCUMENTS

| 2,430,854 | A | * | 11/1947 | Berliner ................ 416/232 |
| 3,620,641 | A | * | 11/1971 | Keen et al. ............. 415/229 |
| 3,706,508 | A | * | 12/1972 | Moskowitz et al. ...... 415/115 |
| 3,950,113 | A | * | 4/1976 | Albrecht ............... 416/97 A |
| 4,321,007 | A | * | 3/1982 | Dennison et al. ........ 415/142 |
| 5,640,767 | A | * | 6/1997 | Jackson et al. ...... 29/889.721 |
| 6,000,908 | A | * | 12/1999 | Bunker ................. 416/95 |
| 6,708,482 | B2 | | 3/2004 | Seda |
| 6,883,303 | B1 | | 4/2005 | Seda |
| 7,510,371 | B2 | * | 3/2009 | Orlando et al. ........ 415/191 |

* cited by examiner

*Primary Examiner*—Christopher Verdier

(57) ABSTRACT

A guide vane for a gas turbine aircraft engine includes an aerodynamic shell for turning a flow of working fluid and an internal spar spaced from the aerodynamic shell by an air gap and reinforced by stiffeners.

5 Claims, 2 Drawing Sheets

GUIDE VANE FOR A GAS TURBINE ENGINE

BACKGROUND OF THE INVENTION

1. Technical Field

This invention relates generally to aircraft gas turbine engines and particularly to a turbine inlet guide vane therefore.

2. Background Art

The operation of turbofan gas turbine engines is well known. Such engines include a serial arrangement of a fan, low and high-pressure compressors, a combustor, and high and low-pressure turbines. Air admitted into the inlet of the engine is compressed by the engine's compressor. The compressed air is then mixed with fuel in the engine's combustor and burned. The high-energy products of combustion of the burned air fuel mixture (often referred to a "hot gas" or "working fluid") then enter the turbine which extracts energy from the mixture in order to drive the compressor and fan. That energy extracted by the turbine above and beyond that necessary to drive the compressor and fan, exits the engine at the core engine exhaust nozzle thereof, producing thrust which powers the associated aircraft. A significant and usually much larger amount of additional thrust is produced by the fan which is driven by the low-pressure turbine, taking in ambient air and accelerating the air to produce the additional thrust.

In two-spool gas turbine engines, the high-pressure compressor and high-pressure turbine rotors are mounted on a first high-pressure shaft, while the low-pressure compressor and low-pressure turbine rotors are mounted on a second, low-pressure shaft which is received within the interior of the first shaft, concentric therewith. The two shafts are supported on several sets of bearings which in conventional engines are attached to and supported by various frame assemblies.

It is a continuing goal of gas turbine engine designers to reduce the weight of such engines without sacrificing the thrust output thereof. Recently, there has been an effort to reduce the weight of such engines by reducing the physical size thereof, making up for any reduction in flow area through the engine by an increase in shaft operating speeds. Thus, as modern engines become more compact for the amount of thrust they produce, there becomes less and less room within the interior of the engine to accommodate such structures as these individual bearing frames.

Recent innovations in gas turbine engines architecture have resulted in "mid-turbine frame" arrangements. In such mid-turbine frame arrangements, the most downstream bearing for the high pressure turbine is moved from radially inwardly of the engine's combustor, a location which, due to the compactness of modern engines, is no longer large enough to accommodate the bearing, to a location downstream thereof between the low and high pressure turbines. The most downstream bearing for the low pressure turbine shaft is moved in an upstream direction, closer to the high pressure shaft bearing so that both bearings may be supported by a single frame assembly and housed within a single bearing housing, thereby reducing engine weight substantially.

Such a mid-turbine frame arrangement requires a strut to transmit mechanical bearing loads from the bearing frame to the engine's case, typically, where the case attaches to a mount by which the engine is connected to an associated pylon and also to accommodate aerodynamic vibratory loading as well. This strut must therefor extend through the hot gas path between the high and low-pressure turbines where it is exposed to gas temperatures as high as 2000° F. or higher. Those skilled in the art will appreciate that accommodating such high heat loads in those struts is critical. While making such struts hollow to accommodate the flow of cooling air therethrough may suggest itself, hollowing out such struts will necessarily weaken them, thereby detracting from the struts' ability to carry the high mechanical loads placed thereon by the bearings. Increasing the mass of the struts to handle such high mechanical bearing loads and accommodate the high thermal loading thereof as well, would necessarily severely increase the strut's weight and therefore be contrary, the goal of reducing the weight of the engine.

Also disposed within the hot gas path between the high and low-pressure turbines are inlet guide vanes. These are aerodynamic structures which turn the exhaust from the high-pressure turbine to an optimal direction for entry into the low-pressure turbine. Since such guide vanes only accommodate aerodynamic loading (both steady state and transient) from the gases passing through the turbine and not the much higher mechanical loading from the bearings as do the struts described hereinabove, such guide vanes tend not to be as mechanically robust as the struts.

It is the current practice to use separate struts and low-pressure turbine inlet guide vanes since the performance requirements of the two are so different. Using separate struts and inlet guide vanes imposes a significant restriction on the flow of working fluid from the high to the low-pressure turbine and adds significant weight to the engine. Accordingly, a combined strut and low-pressure turbine inlet guide vane would be desirable but, heretofore, the diverse load and temperature handling requirements of those two components have rendered the integration thereof into a single component difficult, if impossible to achieve.

DISCLOSURE OF THE INVENTION

The present invention comprises an inlet guide vane which provides the necessary working gas flow alignment while accommodating the extreme mechanical loading from bearing frame in a light weight and compact assembly.

The guide vane of the present invention includes an internal mechanical load carrying spar which effectively transmits bearing loads through the engine's gas path to an engine mount, spaced internally from an aerodynamic shell which provides the necessary directional alignment of the gas flow into the inlet to an associated turbine or compressor. A gap between the spar and the shell may accommodate cooling airflow therethrough to cool the guide vane from the extreme heat loads present in the hot gas flow when the guide vane is employed in conjunction with a turbine.

To reinforce the spar and thereby minimize the mass required to accommodate mechanical loading thereof, the spar is provided with stiffeners around its periphery which optimize the load carrying ability of the spar while contributing only minimally to the weight thereof. In the preferred embodiment, the stiffeners also function as cooling fins which aid in the dissipation of heat transmitted into the gap from the shell so that the spar is not adversely affected by the intense heat loading of the aerodynamic shell. The stiffeners allow the spar to be made hollow or reinforced with spaced ribs at the interior thereof, the volume defined by the hollow spar interior or spaced ribs accommodating any necessary service lines for the engine such as electrical wiring, hydraulic or pneumatic plumbing and the like. The stiffeners may also extend across the gap from the spar to the aerodynamic shell to enhance the structural integrity of the shell.

DETAILED DESCRIPTION OF THE INVENTION

Figure 1:
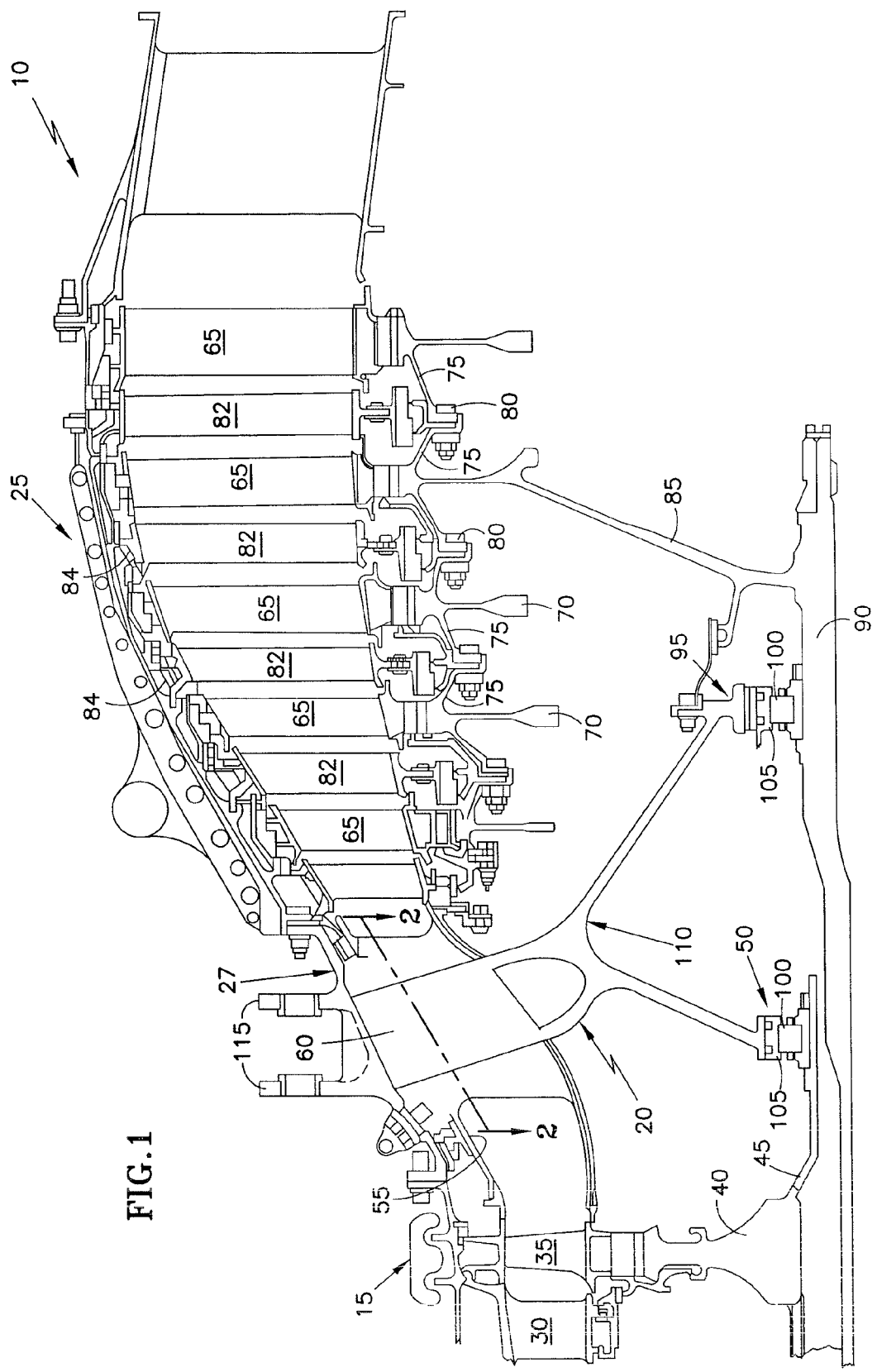
FIG. 1 is a simplified elevation of the turbine section of a modern gas turbine engine, employing the guide vane of the present invention.

Referring to the drawings and particularly FIG. 1 thereof, the turbine section of a modern gas turbine aircraft engine is shown generally at 10. Turbine section 10 comprises a high-pressure turbine section 15, mid-turbine bearing frame 20 and low-pressure turbine section 25 all disposed within the engine's case 27.

High-pressure turbine 15 comprises an inlet guide vane 30 which properly aligns exhaust gases from the combustor (not shown) with the inlet of the high-pressure turbine. The high-pressure turbine itself comprises one or more rows of turbine blades 35 mounted on the rim of a disk 40 in a manner well known in the art. Disk 40 is attached in any known manner to hollow high-pressure shaft 45 supported at the end thereof by high pressure bearing assembly 50.

High-pressure turbine 15 exhausts into an annular flow channel 55 which accommodates the guide vane 60 of the present invention. Guide vane 60 turns the working fluid exhausted from high-pressure turbine 15 into proper alignment with the inlet of low-pressure turbine 25. Low pressure turbine 25, in a manner well known in the art, comprises a number of rows of blades 65 each row mounted on a respective disk 70, the disks 70 being bolted together at spacer arms 75 by bolts 80 in a manner well known in the art. The blades are each disposed between adjacent stationary vanes 82 mounted within case 27 by suitable mounting structures 84. One or more of disks 70 may comprise an extension 85 of low-pressure shaft 90 which is accommodated within the interior of high pressure shaft 45 and supported on bearing assembly 95.

Bearing assemblies 50 and 95 may be of any variety known in the art such as a plurality of bearing rollers 100 which contact the shafts and are radially accommodated within annular races 105. The bearings may also be provided with various housings, lubrication systems, etc. which, for clarity, are not illustrated herein. Bearing assemblies 50 and 95 are each disposed at the end of a bearing support structure 110.

Bearing support structure 110 transmits the mechanical loading from shafts 45 and 90 to an appropriate ground that mounts the engine on an airframe (airframe not shown). For example, in the embodiment shown in FIG. 1, the ground is an engine mount 115 (e.g., comprising a clevis) formed as part of engine case 27. The path of such loading is through the low-pressure turbine inlet guide vane 60 of the present invention.

Figure 2:
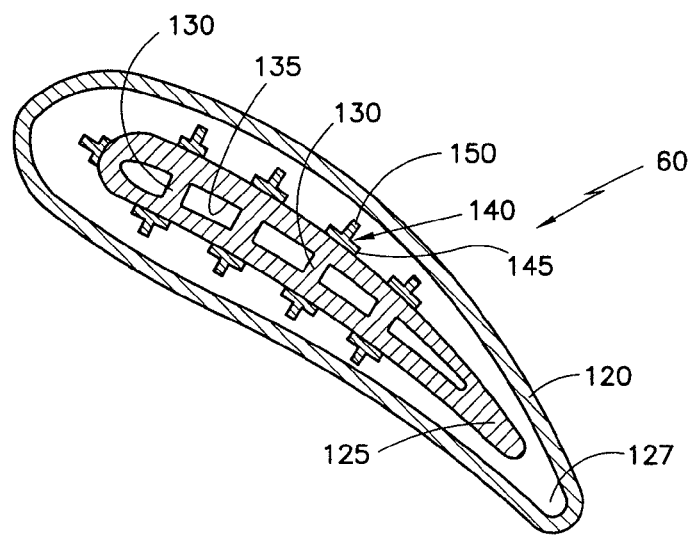
FIG. 2 is a sectioned plan view of the guide vane of the present invention taken in the direction of line 2-2 of FIG. 1.

Referring to FIG. 2 along with FIG. 1, inlet guide vane 60 of the present invention comprises an aerodynamic outer shell 120 which turns the working fluid exhausted from the high-pressure turbine into the proper alignment with the inlet of the low pressure turbine in any manner well known in the art. Shell 120 may be formed from any known high temperature material such as any of various known cobalt alloys. A mechanical load-bearing spar 125 is spaced from shell 120 by a gap 130 which may accommodate a flow of cooling air therethrough. Spar 125 is formed from any of a number of known high mechanical strength materials such as various titanium alloys. The spar may be cast integrally with bearing support structure 110. As set forth hereinabove, to minimize the weight of the mid-turbine bearing frame assembly, it is desirable to render spar 125 as compact and light weight as possible. Therefore, the spar is preferably formed with a hollow interior which may be strengthened by at least one rib 130 which may be cast integrally with the spar. The spacing 135 between the ribs 130 may accommodate various engine service lines such as electrical lines, pneumatic and hydraulic plumbing, etc.

Further contributing to the compact and light-weight characteristics of the spar, are a plurality of spar stiffeners 140 which run longitudinally along the outside of the spar and may be attached thereto by welding or similar techniques or integrally cast with the spar from the same material thereof. In some embodiments, at least a portion of the stiffeners 140 including a longitudinal thermal fin (e.g., fin 150 as described below) for dissipating heat from the outer shell to the gap 127 to the spar 125. At least one of these fins 150 extends partially into the gap 127. In the preferred embodiment, stiffeners 140 are generally T-shaped in cross-section including a base 145 located at the spar surface and a fin 150 extending into the air gap from the base 145 of the stiffener 140 toward aerodynamic shell 120. Fin 150 functions as a cooling fin which aides in convective removal of heat from the spar by the flow of cooling air through gap 130.

Figure 3:
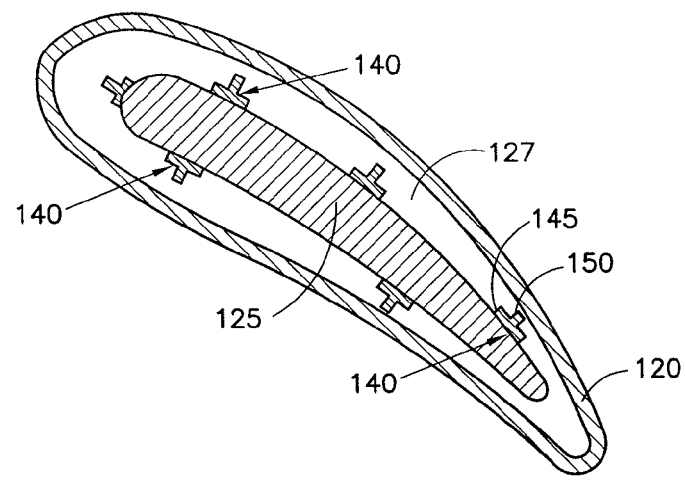
FIG. 3 is a sectioned plan view of an alternate embodiment of the guide vane of the present invention.

Referring to FIG. 3, where the engine size, weight and thrust characteristics allow, spar 125 may be a solid structure without the hollow interior and reinforcing ribs described in conjunction with FIG. 1. In this embodiment, the engine's service lines may be accommodated within gap 127.

Figure 4:
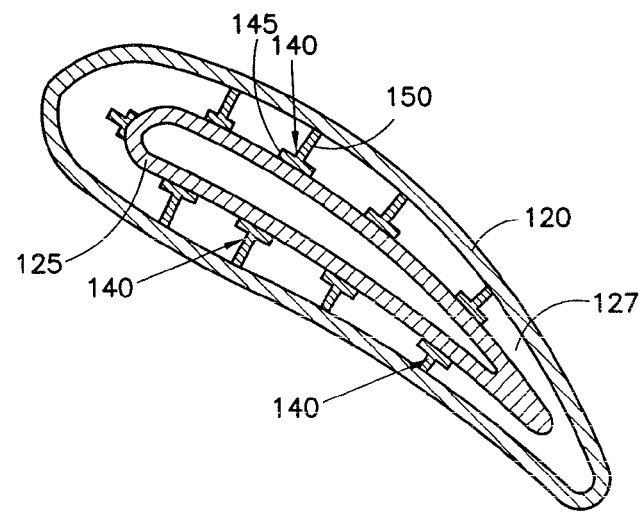
FIG. 4 is a sectioned plan view of a second alternate embodiment of the guide vane of the present invention.

Referring to FIG. 4, for reinforcement of outer aerodynamic shell 120, and enhancement of the cooling of the interior surface thereof, at least some of the fins 150 of stiffeners 140 may extend all the way across gap 127 into contact with the aerodynamic shell and may be attached to the inner surface thereof by brazing or the like. As in the first preferred embodiment, stiffeners 140 in FIG. 3 will also function as cooling fins, providing a more effective convective cooling of the spar by airflow through gap 127. While the stiffeners along the interior of the major surfaces of the spar remain in contact with the inner surface of shell 120, the stiffener at the leading edge of the spar (interiorly of the leading edge of the airfoil shell) is preferably spaced from the shell to allow movement of the leading edge of the shell in response to aerodynamic loading thereof or adjustment to the position or shape thereof by a suitable actuator (not shown). As is the case with the first two preferred embodiments, in the embodiment shown in FIG. 3, the stiffeners may be attached to the spar by brazing or any other suitable technique or integrally performed therewith as by casting.

It will thus be appreciated that the guide vane of the present invention effectively transmits loads from the shaft bearings to the engine mount. The aerodynamic shell maintains the proper alignment of the working fluid flow with the low pressure turbine inlet without being burdened by excessive weight which would be necessary were it required to accommodate bearing loading. Likewise, the load bearing spar may be formed from a lightweight, high strength material which need not accommodate the high temperature loads experienced by the outer shell. The stiffeners provide reinforcement of the spar and shell enhancing the compactness thereof and thus, the minimal weight requirement thereof, and also reinforce the shell against both steady state and transient aerodynamic loading. The stiffeners also function to enhance the convective cooling of the spar and shell by a flow of cooling air through the gap.

While a number of specific embodiments of the present invention have been shown, it will be appreciated that various modifications thereof will suggest themselves to those skilled in the art. Thus, while the spar has been shown as formed in essentially an aerodynamic shape, since it does not in and of itself provide any turning of working fluid, it may be formed into any of various other shape such as ovals or the like. Similarly, while the stiffeners have been shown as being generally T-shaped in cross section, they may take the form of different cross-sectional shapes as well. Also, different numbers of stiffeners from those shown in the preferred embodiment may be employed as may different numbers, shapes and configurations of the spar stiffening ribs. Furthermore, while various materials and attachment schemes have been disclosed in connection with the various components of the guide vane of the present invention, it will be appreciated that functional equivalents of those materials and attachment schemes may be employed. Also while the guide vane of the present invention has been shown and described within the environment of a turbine, it will be understood that the guide vane may be employed with equal utility in a compressor. In such case removal of heat from the guide vane will be much less crucial and therefore, the stiffeners may not need to function as cooling fins. Accordingly, it is intended by the following claims to cover these and other modifications as may fall within the true spirit and scope of this invention.

What is claimed is:

1. A guide vane for a gas turbine engine, said guide vane comprising:
   an aerodynamic outer shell;
   a mechanical load carrying spar disposed within said outer shell and separated therefrom by a gap therebetween;
   a plurality of stiffeners mounted on said spar;
   at least a portion of each stiffener including a longitudinal thermal fin for dissipating heat from said outer shell to said gap and said spar; and
   at least one of said longitudinal thermal fins extending partially into said gap;
   wherein said stiffeners are generally T-shaped in cross-section, each comprising a base mounted on said structural spar and said longitudinal thermal fin extending outwardly from said base toward said aerodynamic outer shell.

2. The guide vane of claim 1 wherein at least one of said longitudinal thermal fins engages an inner surface of said outer shell.

3. The guide vane of claim 1 wherein said spar is hollow.

4. The guide vane of claim 3 wherein said spar includes at least one stiffening rib connected at opposed edges thereof to generally opposed locations on the interior of said spar.

5. A guide vane for a gas turbine engine, said guide vane comprising:
   an aerodynamic outer shell;
   a mechanical load carrying spar disposed within said outer shell and separated therefrom by a gap therebetween;
   a plurality of stiffeners mounted on said spar;
   at least a portion of each stiffener including a longitudinal thermal fin for dissipating heat from said outer shell to said gap and said spar; and
   at least one of said longitudinal thermal fins extending partially into said gap;
   wherein said spar is solid.

* * * * *